(12) United States Patent
Kells et al.

(10) Patent No.: US 9,203,100 B2
(45) Date of Patent: Dec. 1, 2015

(54) FUEL CELL SYSTEM

(75) Inventors: Ashley Kells, Leicestershire (GB); Paul Adcock, Leicestershire (GB); Peter David Hood, Leicestershire (GB); Scott Baird, Nottingham (GB)

(73) Assignee: Intelligent Energy Limited, San Jose, CA (US)

( * ) Notice: Subject to any disclaimer, the term of this patent is extended or adjusted under 35 U.S.C. 154(b) by 1157 days.

(21) Appl. No.: 12/680,507

(22) PCT Filed: Sep. 23, 2008

(86) PCT No.: PCT/GB2008/003225
§ 371 (c)(1),
(2), (4) Date: May 24, 2010

(87) PCT Pub. No.: WO2009/040516
PCT Pub. Date: Apr. 2, 2009

(65) Prior Publication Data
US 2010/0261079 A1 Oct. 14, 2010

(30) Foreign Application Priority Data
Sep. 26, 2007 (GB) .................................. 0718763.6

(51) Int. Cl.
*H01M 8/04* (2006.01)

(52) U.S. Cl.
CPC .......... *H01M 8/0441* (2013.01); *H01M 8/0435* (2013.01); *H01M 8/04037* (2013.01); *H01M 8/04059* (2013.01); *H01M 8/0488* (2013.01); *H01M 8/0491* (2013.01); *H01M 8/04126* (2013.01); *H01M 8/04223* (2013.01);
(Continued)

(58) Field of Classification Search
CPC ..................... H01M 8/04037; H01M 8/04059; H01M 8/04126; H01M 8/04223; H01M 8/04231; H01M 8/04291; H01M 8/04335; H01M 8/0435; H01M 8/04395; H01M 8/0441; H01M 8/04559; H01M 8/04835; H01M 8/0488; H01M 8/0491; H01M 8/04955; H01M 8/04
USPC ......................................... 429/428, 430, 432
See application file for complete search history.

(56) References Cited

U.S. PATENT DOCUMENTS

| | | | |
|---|---|---|---|
| 5,132,174 A | 7/1992 | Romanowski et al. | |
| 6,724,194 B1 | 4/2004 | Barton | |

(Continued)

FOREIGN PATENT DOCUMENTS

| | | |
|---|---|---|
| CN | 1922749 | 2/2007 |
| CN | 1983698 | 6/2007 |

(Continued)

OTHER PUBLICATIONS

Chinese Office Action, dated Jul. 16, 2012, issued in Chinese patent application 2008880117727.0.

(Continued)

*Primary Examiner* — Carlos Barcena
(74) *Attorney, Agent, or Firm* — Baker Hostetler LLP; Mark H. Krietzman

(57) ABSTRACT

The disclosure provides a fuel cell system comprising a fuel cell stack and an electrical control unit configured to adjust operating parameters of the fuel cell stack to optimize operation of the fuel cell system based on a standard deviation of voltage outputs from a plurality of cells in the fuel cell stack.

1 Claim, 6 Drawing Sheets

(52) U.S. Cl.
CPC ...... *H01M8/04231* (2013.01); *H01M 8/04291* (2013.01); *H01M 8/04335* (2013.01); *H01M 8/04395* (2013.01); *H01M 8/04559* (2013.01); *H01M 8/04835* (2013.01); *H01M 8/04955* (2013.01); *H01M 8/04992* (2013.01); *Y02E 60/50* (2013.01)

(56) References Cited

U.S. PATENT DOCUMENTS

| | | |
|---|---|---|
| 2001/0051291 A1 | 12/2001 | Aoyagi et al. |
| 2003/0022031 A1 | 1/2003 | Manery |
| 2003/0049503 A1 | 3/2003 | Ballantine et al. |
| 2003/0170506 A1 | 9/2003 | Gilbert |
| 2004/0038098 A1* | 2/2004 | Imamura et al. ............ 429/25 |
| 2004/0170038 A1 | 9/2004 | Ichinose et al. |
| 2004/0247956 A1 | 12/2004 | Duelk et al. |
| 2004/0247967 A1 | 12/2004 | Resnick et al. |
| 2005/0003250 A1 | 1/2005 | Toukura |
| 2005/0003257 A1* | 1/2005 | Willimowski et al. ........ 429/34 |
| 2005/0048335 A1 | 3/2005 | Fields et al. |
| 2005/0084732 A1 | 4/2005 | Breault |
| 2005/0112430 A1 | 5/2005 | Nuttall et al. |
| 2006/0024537 A1 | 2/2006 | Fujita et al. |
| 2007/0141406 A1 | 6/2007 | Ou |
| 2007/0148512 A1 | 6/2007 | Goto et al. |

FOREIGN PATENT DOCUMENTS

| | | | |
|---|---|---|---|
| GB | 2409763 | 6/2005 | |
| JP | 07029585 | 1/1995 | |
| JP | 2000-208161 | 7/2000 | |
| JP | 2000208161 A * | 7/2000 | ............ H01M 8/04 |
| JP | 2002-83618 | 3/2002 | |
| JP | 2003-151594 | 5/2003 | |
| JP | 2003308859 | 10/2003 | |
| JP | 2003-331886 | 11/2003 | |
| JP | 2003317754 | 11/2003 | |
| JP | 2004-265671 | 9/2004 | |
| JP | 2005-183126 | 7/2005 | |
| JP | 2006-092834 | 4/2006 | |
| JP | 2006-100095 | 4/2006 | |
| JP | 2007-012402 | 1/2007 | |
| WO | 2004/004035 | 1/2004 | |
| WO | 2006/099417 | 9/2006 | |

OTHER PUBLICATIONS

Chinese Office Action, dated Aug. 7, 2013, issued in Chinese patent application 2008880117727.0.
Chinese Office Action, dated Sep. 18, 2014, issued in Chinese patent application 2001310063144.7.
EPO Office Action, dated Mar. 1, 2011, issued in EP patent application 08806379.7.
GB partial Search Report, dated Jan. 25, 2008, issued in GB patent application 0718763.6.
GB Search Report dated May 28, 2008, issued in GB patent application 0718763.6.
GB Examination Report dated Feb. 29, 2012, issued in GB patent application 0718763.6.
Japanese Office Action, dated Mar. 13, 2013, issued in Japanese patent application 2010-526355.
Japanese Office Action, dated Apr. 23, 2014, issued in Japanese patent application 2013-142338.
Japanese Office Action, dated Apr. 23, 2014, issued in Japanese patent application 2013-142339.
Korean Office Action, dated Dec. 27, 2014, issued in Korean patent application 10-2010-7008756.
Mexican Office Action, dated Jun. 26, 2013, issued in Mexican patent application MX/a/2010/003384.
Partial International Search Report, dated Feb. 5, 2009, issued in International patent application PCT/GB2008/003225.
International Search Report and Written Opinion, dated May 28, 2009, issued in International patent application PCT/GB2008/003225.
International Preliminary Report on Patentability, dated Apr. 8, 2010, issued in International patent application PCT/GB2008/003225.
Singapore Written Opinion, dated May 13, 2011, issued in Singapore patent application 201001850.
Singapore Office Action, dated Dec. 19, 2011, issued in Singapore patent application 201001850.
Taiwanese Office Action Dated Nov. 25, 2012, issued in Taiwanese patent application 097136624.

* cited by examiner

FUEL CELL SYSTEM

This application is a national stage filing under 35 U.S.C. 371 of International Application PCT/GB2008/003225 filed on 23 Sep. 2008, (Published on 2 Apr. 2009 as WO/2009/040516), which claims priority from GB Application No. 0718763.6, filed 26 Sep. 2007, the entirety of each being incorporated herein by reference, as if fully set forth herein.

FIELD OF THE DISCLOSURE

The disclosure—relates to the operation of, and apparatus relating to, a fuel cell system, and in particular though not exclusively to a strategy for starting operation of a fuel cell system.

BACKGROUND

Water is integral to the operation of a fuel cell system, for example in the form of the system described herein comprising a fuel cell stack based around a proton exchange membrane (PEM). Reaction of protons (hydrogen ions) conducted through the PEM from an anode flow path, with oxygen present in a cathode flow path, produces water. Excess water needs to be removed from the fuel cell stack to avoid flooding and causing a consequent deterioration in performance. An amount of water, however, needs to be present in at least the cathode flow path to maintain hydration of the PEM, so as to achieve optimum performance of the fuel cell. Managing this water, by deliberate injection and removal, can also provide a useful mechanism for removing excess heat from the fuel cell stack.

To optimize performance, water can be employed deliberately in such fuel cell systems through injection into the cathode flow path of the stack. Such water injection fuel cell systems have potential advantages of reduced size and complexity, as compared with other types of fuel cell systems employing separate cooling channels. Water may be injected directly into the cathode flow path through water distribution manifolds, as for example described in GB2409763.

For water injection systems, it is important that any water fed back into the cathode flow path is of high purity, so as to avoid contamination of the PEM and consequent degradation of stack performance. This requirement for high purity, however, means that additives to lower the freezing point of water cannot be used. For automotive applications in particular, typical requirements include starting up from below freezing, typically as low as −20° C. to replicate environments in which the fuel cell may be used in practice. Since high purity water has a freezing point of 0° C. (at 1 bar pressure), any water left in the fuel cell system will, given sufficient time, freeze after shut-down of the fuel cell.

Ice in the fuel cell system, and in particular within the cathode flow path, can prevent the stack from operating properly, or even at all. If any part of the cathode flow path is blocked with ice, air cannot be passed through the cathode and the fuel cell may not be capable of self-heating to above freezing point. Other methods of heating the whole stack will then be necessary, which will require consumption of external power before the fuel cell can begin supplying electrical power and heat by itself.

SUMMARY

In a first aspect, the disclosure provides a method of starting operation of a fuel cell system comprising a fuel cell stack, the method comprising the steps of:

i) opening an anode inlet valve to allow fuel to enter an anode volume of the fuel cell stack;
ii) operating an air compressor in fluid communication with a cathode air inlet of the fuel cell stack to allow air to enter a cathode volume of the fuel cell stack;
iii) monitoring the temperature of the cathode inlet and/or outlet; and
iv) operating a water injection system to inject water into the cathode volume once the temperature of fluid passing through the cathode inlet and/or outlet exceeds a preset level,
wherein a current drawn from the fuel cell stack is limited to prevent a voltage measured across one or more cells in the fuel cell stack from falling below a first voltage threshold.

In a second aspect, the disclosure provides a fuel cell stack comprising a plurality of fuel cells, each end of the fuel cell stack having a heater plate disposed between a current collector plate and an end plate, each heater plate being thermally insulated from a respective end plate.

In a third aspect, the disclosure provides a fuel cell system comprising a fuel cell stack and an electrical control unit configured to:

i) open an anode inlet valve to allow fuel to enter an anode volume of the fuel cell stack;
ii) operate an air compressor in fluid communication with a cathode air inlet of the fuel cell stack to allow air to enter a cathode volume of the fuel cell stack;
iii) monitor the temperature of the cathode inlet and/or outlet; and
iv) operate a water injection system to inject water into the cathode volume once the temperature of fluid passing through the cathode inlet and/or outlet exceeds a preset level,
wherein the electrical control unit is configured to limit a current drawn from the fuel cell stack to prevent a voltage measured across one or more cells in the fuel cell stack from falling below a first voltage threshold.

In a fourth aspect, the disclosure provides a fuel cell system comprising a fuel cell stack and an electrical control unit configured to adjust operating parameters of the fuel cell stack to optimize operation of the fuel cell system based on a standard deviation of voltage outputs from a plurality of cells in the fuel cell stack.

In a fifth aspect, the invention provides a method of optimizing operation of a fuel cell system comprising a fuel cell stack and an electrical control unit, the method comprising: providing an indication of a voltage output from each of a plurality of cells in the fuel cell stack to the electrical control unit; and optimizing operation of the fuel cell system based on a standard deviation of the voltage outputs from the plurality of cells, wherein the electrical control unit adjusts the operating parameters of the fuel cell stack to optimize operation of the fuel cell system.

Other features and advantages of the present disclosure will be set forth, in part, the descriptions which follow and the accompanying drawings, wherein the implementations of the present disclosure are described and shown, and in part, will become apparent to those skilled in the art upon examination of the following description taken in conjunction with the accompanying drawings or may be learned by practice of the present disclosure.

DRAWINGS

The disclosure will now be described by way of example only, with reference to the appended drawings in which.

ADDITIONAL DETAILS

In the following description, various exemplary implementations, aspects and characteristics are discussed as directed toward surgical instruments, tools, systems and methods more particularly applied to the spine. The focus on this application is not intended to be, nor should it act as, a limitation to the scope of this disclosure. The other features and advantages of the present disclosure will be set forth, in part, in the descriptions which follow and the accompanying drawings, wherein the implementations of the present disclosure are described and shown, and in part, will become apparent to those skilled in the art upon examination of the following description taken in conjunction with the accompanying drawings or may be learned by practice of the present disclosure.

Heading and Titles are not intended to be limitations and should be read in a general sense. Implementations may include several novel features, no single one of which is solely responsible for its desirable attributes or which is essential to practicing the disclosure described herein. The advantages of the present disclosure may be attained by means of the instrumentalities and combinations particularly pointed out in the disclosure and any appended claims.

Figure 1:
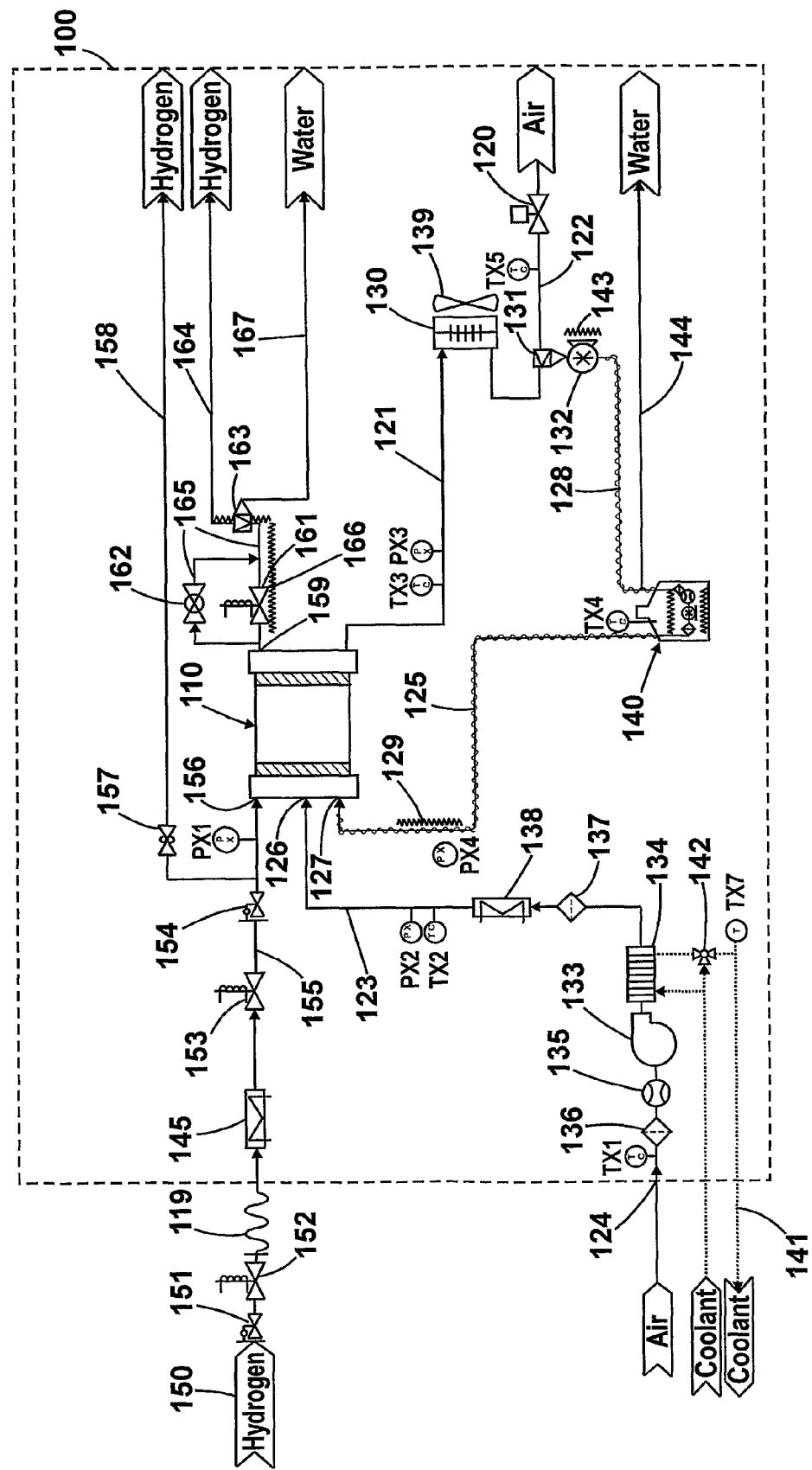
FIG. 1 illustrates a schematic diagram of the arrangement of various components within an overall fuel cell system.

FIG. 1 shows a schematic diagram of an exemplary fuel cell system 100 comprising a fuel cell stack 110 and other associated components. The fuel cell stack 110 has a cathode flow path passing through it, the cathode flow path comprising an air inlet 124 leading to an air inlet line 123 and into the stack at the cathode air inlet 126. After passing through an internal cathode volume (not shown) within the fuel cell stack 110, the cathode flow path exits the fuel cell stack 110 into the cathode exit line 121, through the cathode exhaust line 122 and an exhaust shut-off valve 120. During normal operation, the exhaust shut-off valve 120 is partially or fully open. Various components such as a heat exchanger 130, with associated cooling fan 139, and a water separator 131 may be connected to or part of the cathode exit line 121 and exhaust line 122 in the cathode flow path. Temperature sensors TX1, TX2, TX3, TX5 and pressure sensors PX2, PX3 may also be present, connected at appropriate places to monitor the inlet line 123 and exit line 121 of the cathode flow path.

The expression 'cathode system' in the present context is intended to encompass those parts of the fuel cell system 100 that are associated with the cathode volume within the fuel cell stack. These include the various internal components of the fuel cell such as the inlets, outlets, the internal flow path and water distribution structures, as well as components in fluid communication with the cathode volume such as the various inlet, outlet, recirculation and exhaust lines for both liquids and gases. The term 'cathode flow path' is intended to encompass a subset of the cathode system that includes a fluid flow path from the air inlet 124 through an air compressor 133, the inlet line 123, the cathode volume of the fuel cell stack 110, and the cathode exit line 121. The terms 'anode system' and 'anode flow path' are to be interpreted similarly, with reference to the various components of the fuel cell system 100 associated with the anode volume.

The air compressor 133, connected to the cathode air inlet line 123, provides compressed air to the cathode flow path. Other components such as an air inlet heat exchanger 134, a flow meter 135, one or more air filters 136, 137 and an air heater 138 may be present in the cathode inlet line 123 between the air inlet 124 and the fuel cell stack 110. The air inlet heat exchanger 134 may be used in conjunction with a coolant line 141, a three-way valve 142 and a temperature sensor TX7 to pre-heat air from the air compressor 133 with coolant from the coolant line 141 during operation of the fuel cell system 100. The coolant line 141 passing through the air inlet heat exchanger 134 forms a separate cooling circuit configured to extract heat from the air stream after the compressor 133. This coolant line 141 is preferably operated after the fuel cell stack 110 reaches a normal operating temperature, in order to avoid extracting heat from the air inlet stream in the cathode air inlet line 123 during start-up of the system 100. Diversion of coolant in the line 141 may be achieved through use of the valve 142, allowing control over whether coolant is delivered to the heat exchanger 134. Since the coolant line 141 is separate from water fed into the cathode system, the requirement for high purity water is not the same. The coolant used in the coolant line 141 may therefore comprise additives such as glycol to lower the freezing point of the coolant used.

Fuel, typically in the form of gaseous hydrogen, enters the fuel cell system via a pressure-reducing valve 151 and an actuated valve 152, preferably in the form of a normally closed solenoid-actuated valve. The fuel supply 150, when in the form of hydrogen gas, is typically located remotely from the fuel cell system, for example in the form of a pressurized tank towards the rear of a vehicle. A further solenoid-actuated valve 153 and a pressure-reducing valve 154 may be provided closer to the fuel cell stack 110 in the fuel inlet line 155 of the anode flow path between the fuel source 150 and the anode inlet 156 of the fuel cell stack 110. Two separate sets of valves are therefore provided leading to the anode inlet 156, one set 151, 152 near to the tank and the other set 153, 154 closer to the fuel cell stack 110, with an intermediate pressurized fuel line 119 in between. The pressure-reducing valve 154 regulates the pressure of the dry fuel gas to a level suitable for introduction to the fuel cell stack 110. The pressure-reducing valve 154 is preferably a passive device which has a preset pressure setting applied, although an actively controlled device may be used. A fuel heater 145 is optionally provided, for example in the pressurized fuel line 119 before the valve 153, as shown in FIG. 1, or alternatively in the fuel inlet line 155 either before or after the pressure-reducing valve 154.

A further actuated valve 161 is provided on the anode exit line 165. Each actuated valve 152, 153, 161 may be provided with a local heater element to defrost the valve as required, although activation of the valves 152, 153, 161 through passage of current through the solenoid will provide a certain degree of heating. Preferably each of the actuated valves 152, 153, 161 is configured to be fail-safe, i.e. will only open when actuated by current passing though the solenoid.

To monitor and to relieve pressure of fuel within the anode flow path, a pressure sensor PX1 and/or pressure relief valve 157 may be provided. The pressure relief valve 157 is preferably set to open and exhaust fluid from the anode flow path through a pressure relief exhaust line 158 when the pressure in the anode flow path exceeds a safe operating level.

A further manually operable valve 162 in the anode exit line 165 may be present, this valve 162 being for used for example during servicing to ensure depressurization of the anode flow path. Water build-up in the anode flow path in the fuel cell stack 110 may occur, for example as a result of diffusion of water through the PEM from the cathode side. Consequently, an anode exhaust water separator 163 may be provided in the anode exhaust line 164 to separate any water present in the exhaust line 164. This water can be exhausted or optionally recirculated. During operation of the fuel cell stack 110, the valve 161 is typically held closed, and only opened intermittently to exhaust any built-up water from the anode fluid path.

A cathode water injection inlet 127 is provided in the fuel cell stack 110, the inlet 127 connected to a cathode water injection line 125. The cathode water injection line 125 may be heated along a part or the whole of its length, and extends between a water containment vessel 140 and the cathode water injection inlet 127. A heater 129 may be provided to apply heat to a specific region of the line 125 to heat water passing through the injection line 125 towards the cathode water injection inlet 127. A further pressure sensor PX4 may be provided on the cathode water injection line 125 in order to monitor the back-pressure on the line 125 during operation.

Water from the cathode exit line 121 is pumped with a water pump 132, optionally provided with a heater 143, through a water return line 128 towards a water containment vessel 140. Excess water is ejected from the fuel cell system 100 out of the water containment vessel 140 through a water overflow line 144.

The anode exit solenoid valve 161 is configured to regulate a saturated gas and liquid stream exhausted from the fuel cell stack 110. As with the anode inlet solenoid valve 153, the anode exit solenoid valve 161 is electronically controlled and may be either open or closed, being preferably closed when de-energized. As the valve 161 is subjected to a liquid/saturated gas stream, water droplets may be present around the valve when the system 100 is shut down. If the system is then subjected to sub-zero ambient conditions, the valve 161 may then be frozen shut. Simply energizing the valve is usually insufficient to break the ice, hence a combination of external heating through a heater element 166 together with use of internal heating due to the energized coil may be required.

The heater 166 is preferably configured to apply heat to the anode exit solenoid valve 161 as well as an anode exit water separator 163. The heater 166 may comprise a positive temperature coefficient (PTC) heating element, regulated to a suitable temperature range. The anode exit line water separator 163 is configured to separate water from the mixed gas and liquid exhaust stream from the anode exit 159 of the fuel cell stack 110. Preferably, the anode exit line water separator 163 is configured such that water passing through the anode water exhaust line 167 does not contain saturated gas in the form of bubbles in the exhaust water, so as to minimize the risk of a potentially explosive mixture arising in the anode water exhaust. The remaining fuel gas may be recycled back into the anode inlet 156.

The configuration of the anode system shown in FIG. 1 may also be used to detect leaks in the fuel cell stack 110. Opening the anode inlet solenoid valve 153 while maintaining the anode exit solenoid valve 161 and bypass valve 165 closed, an amount of gas is allowed to pass into the anode volume of the fuel cell stack 110. The anode inlet solenoid valve 153 is then closed, and the pressure at the anode inlet 156 monitored over time by means of the pressure sensor PX1. Comparing the pressure as a function of time with a pre-calibrated curve, which accounts for loss of fuel by conduction of protons through the PEM, allows for diagnosis of any additional losses present as a result of leaks in the fuel cell stack or in associated components in the anode flow path.

As heat is generated while the valve is energized, the control strategy employed preferably takes this into account during sub-zero operation. Although it might be unrealistic to assume that the valve can be opened immediately when the system is started at sub-zero conditions, the time required to open the valve should nevertheless be minimized. The pressure transducer PX1 on the anode inlet line 155 can be used to monitor opening and closing of the anode exit valve 161, and an operational strategy can be changed from internal warming to normal operation accordingly once the transducer PX1 indicates that the valve 161 is operating correctly. Because the anode exit valve 161 is normally closed, the pressure transducer will register a reduction in pressure if the valve 161 is opened. If the valve is prevented from opening because of a build-up of ice, this can be registered by the absence of a pressure drop on energizing the valve 161. The control strategy can consequently be configured to apply further heating to the valve 161 until a pressure drop is registered on energizing the valve 161.

To relieve pressure of fuel within the anode flow path, a pressure relief valve 157 may be provided. The pressure relief valve 157 is preferably set to open and exhaust fluid from the anode flow path through a pressure relief exhaust line 158 when the pressure in the anode flow path exceeds a safe operating level. The safe operating level may be set off-line using a calibrated pressure transducer and according to the rated pressure of the fuel cell stack 110.

A further manually operable valve 162 in the anode exit line 165 may be present, this valve 162 being used for example during servicing to ensure depressurization of the anode flow path. Water build-up in the anode flow path in the fuel cell stack 110 may occur, for example as a result of diffusion of water through the PEM from the cathode side. Consequently, the anode exhaust water separator 163 may be provided in the anode exhaust line 164 to separate any water present in the exhaust line 164. This water can be exhausted or optionally recirculated. During operation of the fuel cell stack 110, the valve 161 is typically held closed, and only opened intermittently to exhaust any built-up water from the anode fluid path.

A cathode water injection inlet 127 is provided in the fuel cell stack 110, the inlet 127 connected to a cathode water injection line 125. The cathode water injection line 125 may be heated along a part or the whole of its length, and extends between a water containment vessel 140 and the cathode water injection inlet 127. A heater 129 may be provided to apply heat to a specific region of the line 125 to heat water passing through the injection line 125 towards the cathode water injection inlet 127. A further pressure sensor PX4 may be provided on the cathode water injection line 125 in order to monitor the back-pressure on the line 125 during operation.

Water from the cathode exit line 121 is pumped with a water pump 132, optionally provided with a heater 143, through a water return line 128 towards the water containment vessel 140. Excess water is ejected from the fuel cell system 100 out of the water containment vessel 140 through a water overflow line 144. Further details of the water containment vessel are provided in the co-pending GB application "Fuel cell system", having the some filing date as the present application.

Figure 2:
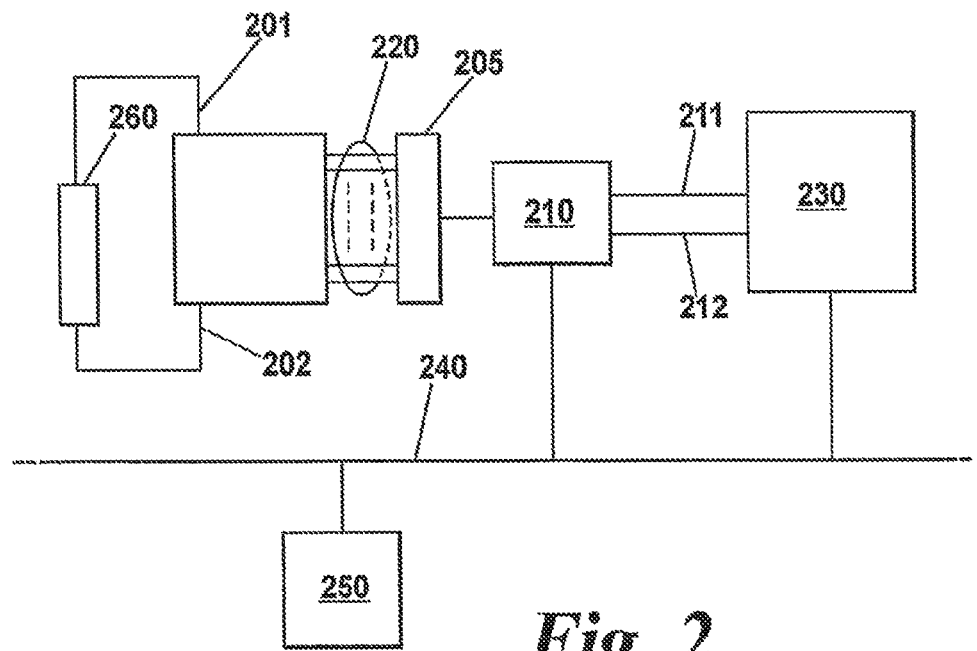
FIG. 2 illustrates a schematic diagram of an exemplary electrical control system for a fuel cell system.

FIG. 2 illustrates a schematic diagram of an exemplary electrical control system 200 associated with the fuel cell stack 110 of FIG. 1. Electrical power outputs 201, 202 are connected to an electrical load 260, which represents various components of an automotive system including a motor together with other electrically powered components. As the current applied to through the load 260 increases during start-up, current derived from an external power source (e.g. a battery or, in a stationary application, mains-derived electric power) can be correspondingly reduced to maintain the current demanded by the load 260. Voltages of individual cells within the fuel cell stack 110 are output from the stack 110 via electrical connections to each bipolar plate, the voltages output on a plurality of voltage lines 220. Indications of the voltage from each cell are input, via a multiplexer 205, to a microcontroller 210.

The voltage output of each cell of the fuel cell stack 110 can be measured via connection to a side tab incorporated into the design of the individual fuel cell bipolar plates. The side tab could be in the form of a male connector, thus allowing the use of a female push fit connector, for example of the spade-type connectors commonly used in automotive applications. This connection style is suitable for high levels of vibration. The voltage of each cell may be determined with respect to a defined zero through use of a series of differential amplifiers in the multiplexer 205. The multiplexed voltage indications are input to the microcontroller 210.

The microcontroller 210 is configured to assess the voltage of each cell in the fuel cell stack 110, and to control action of two digital relays configured to drive two output lines 211, 212. The digital relays, which may be integrated within the microcontroller 210, are controlled to indicate whether the voltage of one or more cells in the fuel cell stack 110, as provided on voltage lines 220, falls below certain set threshold voltage values. For fail-safe purposes (for example in the case of a faulty connection), the microcontroller 210 is configured to set each of the output lines high only if a respective voltage threshold level is exceeded by all of the cells in the fuel cell stack. Both lines 211, 212 being held high therefore indicates a 'healthy' state of operation of the stack. The microcontroller 210 is configured to set the digital relays to trigger at different voltage threshold levels: a first voltage threshold indicating a failure condition and a second voltage threshold indicating a warning condition. Typically, the second voltage threshold is higher than the first voltage threshold. These voltage threshold values could be set via a software interface to the microcontroller 210. Thus, the digital information on output lines 211, 212. corresponding to the first and second voltage threshold values respectively, can be used by the fuel cell electrical control system 200 to regulate electrical current drawn through the output connections 201, 202 and to adjust parameters such as air flow rate in order to actively improve the health and durability of the fuel cell stack 110. Typical values for the first and second voltage levels are around 0.4V and 0.6V respectively, but these values may vary depending on various factors including the thermal balance and acceptable load on the stack.

The use of cell voltage threshold information is a useful way of ensuring safe operation of a fuel cell, because a number of different recoverable faults can typically be indicated by one or more cells having a low voltage output. Preferably, the voltage level of the worst performing cell is used to determine the levels set on the output lines 211, 212.

In the event of a warning condition, indicated by the output line 212 being set low, the control parameters of the fuel cell stack 110 can be gradually adjusted, or the fuel cell current load limited, until the warning ceases, indicated by the output line 212 being set high. In the case of a failure condition, indicated by output line 211 being set low, the load 260 may be temporarily disconnected from the fuel cell stack 110, for example by releasing an electrical contactor (not shown) installed between the fuel cell stack 110 and the electrical load 260. The load 260 can be subsequently re-connected once the failure condition has been removed, indicated by the microcontroller setting the output line 211 high.

The microcontroller 210 may be replaced with hardware comparators to determine whether cell voltages are below preset threshold levels. A level of software is therefore removed, thus increasing the robustness of the technique. This may be particularly advantageous when considering certification and speed of response of the overall system 200.

In addition to the action of the digital relays, the microcontroller 210 can also be configured to publish the cell voltage data information on a CAN (Controller Area Network) 240. The CAN allows a profile of fuel cell stack 110 voltages from voltage lines 220 to be monitored and/or logged via appropriate hardware such as an external computer 250 and/or a fuel cell electrical control unit (ECU) 230. Various functions relating to optimization of the fuel cell system operation may be incorporated into the ECU, while an external computer may be used for detailed diagnostics and testing of the fuel cell system via information made available on the CAN.

The cell voltage profile data may be used to improve the efficiency and performance of the fuel cell over time and under different conditions, through comparison with known profiles. For example, a distribution of cell voltages across the fuel cell stack being lower at the edges of the stack 110 and rising in the center of the stack 110 typically indicates that the fuel cell stack 110 is cold or is receiving too much cooling. The reverse situation, i.e. where the voltage levels fall towards the center of the stack 110, indicates that the fuel cell stack 110 is hot or is receiving too little cooling. The former situation can be remedied by decreasing the level of cooling and/or applying heat to the ends of the stack 110, while the latter situation can be remedied by increasing the level of cooling and/or reducing a level of heat applied to the ends of the stack 110. The ECU may be configured to monitor the voltage levels of the fuel cell stack 110 at set time intervals, typically every 100 ms. For diagnosis and optimization of fuel cell behavior, monitoring of the voltage levels may also be carried out over longer time intervals, typically of the order of minutes or hours, and may be aimed at maximizing the lifetime of the fuel cell stack rather than optimizing its immediate operational efficiency.

The temperature of the cathode inlet and/or outlet is preferably monitored by a fuel cell system controller, such as the ECU 230. This monitoring may include taking actual temperature measurements of the cathode inlet and/or outlet streams, for example by means of temperature sensors TX2, TX3. The anode exit temperature may also be monitored, for example by means of a temperature sensor on the anode exit line 165. Alternatively, or additionally, the temperature of the cathode inlet and/or outlet may be monitored indirectly through measurements of other fuel cell parameters in conjunction with a known predetermined thermal behavior model of the fuel cell stack 110. The parameters may, for example, be those of time and electric current drawn over time. Taking into account the known thermal behavior of the fuel cell stack allows the fuel cell controller 230 to determine indirectly at what point the cathode flow path passing through the fuel cell stack 110 reaches the minimum required temperature for commencement of water injection. The thermal behavior model may, for example, include parameters such as the rate at which heat is lost to the surrounding environment for a range of temperatures, and the heating effect in the fuel cell stack for a range of current drawn. By integrating a measure of current drawn over time, together with any additional heating effect due to components such as the end plate heaters 330a, 330b, while taking into account heat lost from the stack 110 over this time, an estimate of the temperature within the cathode fluid flow path can be calculated.

In a general aspect therefore, monitoring the temperature of the cathode inlet and/or outlet may comprise taking temperature measurements of the cathode inlet and/or exit streams. Monitoring the temperature of the cathode inlet and/or outlet may comprise calculating an estimate of the cathode inlet and/or exit streams using a measurement of current drawn from the fuel cell stack over time. The latter approach preferably takes into account a predetermined thermal model of the fuel cell stack 110.

An additional use for the cell voltage information is through use of an optimization algorithm which seeks to maximize fuel cell health and overall system efficiency. The optimization algorithm should require no knowledge of the mechanisms of the system, and be arranged to provide a solution based on final values of the relevant criteria. In a simplified form, the optimization may seek to reduce, and preferably minimize, the following cost function:

$$f(\sigma_v, P_p) = \alpha(\sigma_v)^2 + \beta(P_p)^2$$

where $\sigma_v$ is a standard deviation of the voltage outputs of the plurality of cells, $P_p$ is a parasitic load and $\alpha$, $\beta$ are constants. Alternatively, the optimization algorithm may use the standard deviation of the cell voltage outputs alone, seeking to reduce or minimize this to optimize the output of the stack 110.

The above cost is typically calculated at prescribed intervals by taking a snapshot of the fuel cell system data including the distribution of cell voltages on voltage lines 220. Within a certain range, the standard deviation of the individual cell voltages of the fuel cell stack are dependent upon the air stoichiometry of the system. In this context, the stoichiometry of the system refers to the molar quantity of oxygen available within the cathode volume of the fuel cell stack 110 compared to the amount necessary to react with the amount of fuel being fed into the anode volume. A stoichiometric balance of oxygen and hydrogen is indicated by the overall reaction:

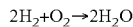

$$2H_2 + O_2 \rightarrow 2H_2O$$

For a stoichiometric balance according to the above equation, twice as many moles of hydrogen gas are required as moles of oxygen gas. A cathode stoichiometry of 2 therefore indicates that the same number of moles of oxygen $O_2$ are passing through the cathode system as there are moles of hydrogen $H_2$ entering the anode system. Typically, a stoichiometry of at least 2 is required to maintain reaction efficiency in a normally-closed cathode system. In an open cathode system, the stoichiometry may be as high as 50, i.e. indicating that there are 25 times as many moles of oxygen gas available as there are moles of hydrogen gas. An increase in stoichiometry towards an oxygen rich balance typically results in an increase in gross fuel cell stack performance and a reduction in fuel cell voltage standard deviation. However, in order to achieve this increase in available oxygen content an increase in parasitic load due to the air delivery method used (typically the air compressor 133) is required. Hence, the cost function above is preferably balanced so as to achieve a suitable balance between parasitic load and fuel cell stack voltage output distribution.

The parasitic load on the fuel cell stack may be indicated by a measure of electric power consumed by one or more components of the fuel cell system 100 during operation. A measure of parasitic load can therefore be determined from measurements of current provided to one or more of the: air compressor 133; heater plate(s) 330 (described in more detail below); and heaters 138, 145 for raising the temperature of the cathode and anode inlet streams. A principle measure of parasitic load may be indicated by a measure of auxiliary electric power drawn by the air compressor 133, since this controls the stoichiometric balance of gases in the fuel cell stack 110. Such a measurement could, for example, be obtained through measuring current drawn by the air compressor 133 and/or other electrically-operated devices such as pumps, valves, sensors, actuators and controllers. The air compressor 133 may be powered from a high voltage supply, in which case a measurement of current drawn from this supply can provide the necessary indication.

Starting from an initial condition, an optimization routine typically updates the cathode (air) stoichiometry set point at set time intervals, for example each minute. This allows the system to gradually optimize according to different ambient conditions such as changes in ambient pressure (e.g. altitude) or temperature and stack health (e.g. stack degradation due to aging).

To aid start-up of the fuel cell system 100 from sub-zero ambient temperature, some or all of the following features may be required:
 i) a heated hydrogen exit valve 161 (purge valve) and water separator/collector 163 (shown in FIG. 1);
 ii) heaters 138, 145 for raising the temperature of the cathode and anode inlet streams;
 iii) heaters 330 to raise the temperature of the current collectors in the fuel cell, further detailed below with reference to FIGS. 3, 4a and 4b;
 iv) a source of liquid water available for introduction to the fuel cell stack, such as the water containment vessel 140 (FIG. 1);
 v) trace heating of lines for carrying liquid water, including the water injection line 125 and water ejection line 128 (FIG. 1); and
 vi) heating of an area around the fuel cell water injection inlet 127.

An exemplary startup procedure may be detailed as follows. First, the air compressor 133 is started and set to provide a fixed flow rate to the fuel cell stack cathode air inlet 126. For a fuel cell stack having a 200 square cm active area, the flow required may be set to achieve according to a current set point of 80 A or more. This is followed by heating of the water lines 125, 128, the hydrogen exit valve 161, the fuel cell stack current collectors 320a, 320b (to be described in connection with FIG. 3) and scavenge pump 132 between the water separator 131 and water containment vessel 140. Heaters on the cathode and anode inlet lines 123, 155 are activated such that the inlet temperatures of the gas streams at the cathode air inlet 126 and anode fuel inlet 156 are preferably between 5 and 10° C. When starting from sub-zero ambient conditions, the temperature of each stream is regulated to a maximum of 10° C. in order to ensure that any water at the top of the fuel cell stack (where the gases are typically introduced) does not defrost too quickly and subsequently freeze in the lower section of the fuel cell stack, which may still be below freezing point. The gases are thereby used at least partly to heat the cathode and anode fluid pathways to a degree such that the fuel cell stack does not cause water injected into the stack via the water injection inlet 127 to freeze.

The anode inlet valve 153 and purge valve 161 are then activated. In this startup state, an aggressive action for the purge valve is instigated by repeatedly activating the purge valve 161 to promote self-heating within the valve 161 to defrost and to dislodge, through vibrations caused by the repeated activation, any small build up of ice that might prevent immediate opening of the valve.

Until the cathode inlet and exit temperatures are above at least 5° C., the fuel cell stack is operated without cooling/humidification via cathode water injection. This is to ensure that introduction of water through the cathode water injection inlet does not result in ice formation within the cathode volume of the fuel cell stack 110.

The fuel cell ECU takes control of the current that is drawn from the stack 110. An upper limit is set for the current that may be drawn, and the fuel cell ECU then dictates what current should be drawn from the fuel cell. This current limit is between zero and the upper current limit, and is set by the ECU. This current limit should be less than or equal to the rated current for the fuel cell. For a more rapid startup, the fuel cell ECU 230 can set the current drawn from the fuel cell stack 110 as high as is permitted by the values set on digital lines 211, 212. The fuel cell ECU 230 continuously monitors the health of the fuel cell stack 110 and applies or removes the load 260 accordingly. The load 260 is generally applied and removed at fixed rates with respect to time, usually such that the current is reduced, i.e. on occurrence of a voltage warning threshold being passed, at a rate higher than the rate at which the current is increased when no warning threshold is passed. The fuel cell current is increased such that the current increases according to a target control line and until a rated current of the fuel cell stack 110 is reached. However, the fuel cell ECU 230 primarily uses the warning level on line 212, i.e. the upper of the two voltage threshold indicators, to regulate the current that is drawn from the fuel cell stack 110 if the voltage of one or more cells falls below the warning (or second) voltage threshold. The basic premise is to keep increasing the current drawn from the fuel cell in line with a predetermined target control line until a warning is indicated. The predetermined rate at which the current is increased may be set according to particular characteristics of the fuel cell stack such as the stack size, and the rate may be predetermined to vary according to, for example, the magnitude of current drawn from the stack or a measure of temperature. The maximum rate at which the current is increased is preferably a predetermined value, typically between 1 and 3 Amps per second depending on the size of the stack. This maximum rate determines the fastest time that the fuel cell system can reach full output power from a cold start. If a current setpoint request, e.g. received from an external system, is less than this maximum rate, the fuel cell system will follow this lower value. After a warning is indicated, the current is then reduced until the warning disappears. Hence, the control essentially applies the maximum current that the fuel cell can handle without triggering a cell warning. An advantage of this approach is that heat generated by the fuel cell increases with an increased current, hence higher currents equate to a faster time to defrost. This process of initial heating preferably occurs before any injection of cooling/humidification water.

In a general aspect, the current drawn from the fuel cell stack 110 is limited to prevent a sum of cell voltages across the fuel cell stack falling below a third voltage threshold, the third voltage threshold being higher than the second (warning) voltage threshold multiplied by the number of cells in the fuel cell stack 110. However, if the voltage of any individual cell falls below the warning voltage threshold, the current is limited until the voltage rises again above the threshold.

Starting from cold, the total voltage of the stack may be regulated at a preset constant value, this value being the number of cells multiplied by a preset regulated voltage for each cell. A typical voltage for an individual cell may be around 0.65V, and therefore a regulated voltage for a 20 cell stack will be 13V. Although the total stack voltage is regulated, if an individual cell falls below warning voltage threshold, for example 0.4V or around 62% of the rated voltage, the current drawn is further regulated the prevent the cell voltage from falling further.

A preset ramp rate increase for the current may be applied rather than regulation using the overall stack voltage. However, the preset voltage can be used to automatically correct for stack starting temperature and other conditions.

In practice, a mathematical function may be used as the set point for the stack current, which could take into account one or more factors including stack voltage, temperature of the stack, ambient temperature, time from start and a standard deviation of all the cell voltages.

Once the temperature of the cathode inlet 156 and exit 159 are above 5° C., external cooling/humidification water may be added to the fuel cell stack 110 via the cathode water injection inlet 127. Also at this point, the control of the fuel cell current may revert to some other method which is utilized for normal operation, and any heaters on the fuel cell stack 110 may be switched off.

Figure 3:
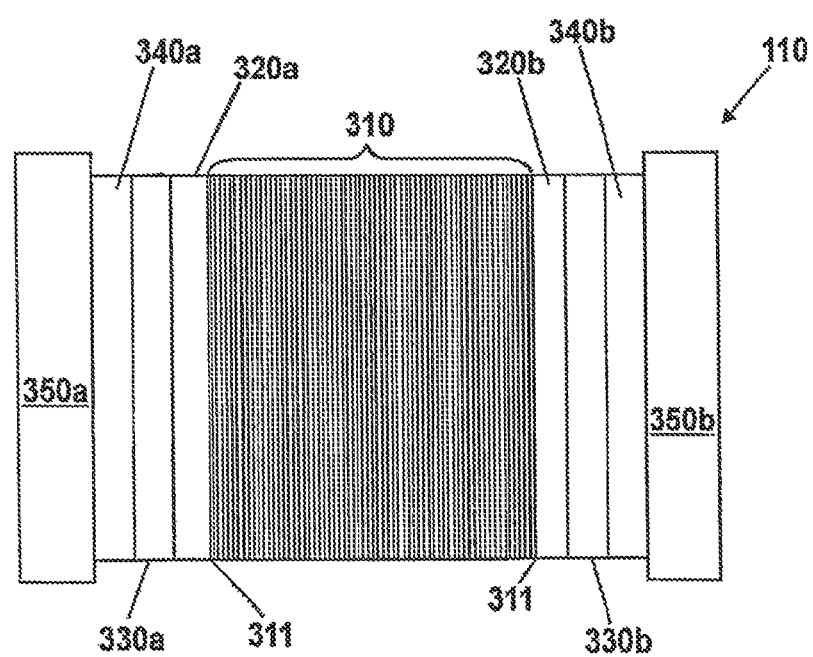
FIG. 3 illustrates a schematic side view of an exemplary fuel cell stack.

FIG. 3 illustrates schematically a side view of an exemplary fuel cell stack 110. The stack comprises a stack of individual fuel cells 310, with current collector plates 320a, 320b at opposing ends of the stack of cells 310. Heater plates 330a, 330b are provided towards opposing ends of the fuel cell stack 110, each heater plate 330a, 330b being disposed between a respective current collector plate 320a, 320b and a respective end plate 350a, 350b. Each heater plate 320a, 320b is thermally and electrically insulated from the respective end plate 350a, 350b, preferably by means of further insulator plates 340a, 340b disposed between the respective heater plates 330a, 330b and end plates 350a, 350b.

The main objective of the heater plates 330a, 330b is to heat up the end cells 311 at the same rate as the rest of the cells in the middle of the stack of cells 310. The heater plates 330 also warm the water feed channel to the manifolds so that when the water is switched on it does not freeze.

Each heater plate 330, as shown in FIGS. 4a and 4b, is constructed from two electrical heating circuits. The circuits, for example in the form of copper tracks, are preferably embedded in the plate 330 and thereby isolated from an adjacent current collector. FIG. 4a shows a perspective view of one face of an exemplary heater plate 330, while FIG. 4b shows a perspective view of the opposing face of the same heater plate 330. The plate 330 generally comprises two buried tracks in the form of electrically conductive heating elements 410, 420 formed on a printed circuit board 430, the heating elements 410, 420 forming serpentine tracks running across the heater plate over an area corresponding to the active area of the underlying fuel cells in the fuel cell stack 110. For clarity, the buried tracks 410, 420 are shown to be visible in FIG. 4a, but in practice the tracks may not be visible through being covered by an electrically insulating cover layer and/or a further circuit board. The heater plate 330 is powered externally via an electrical source such as a storage battery, with positive and negative terminal connections via side tabs 411, 412, 413, 414 in the form of spade connections on an edge of the heater plate 330. These tabs 411, 412, 413, 414, although located close together for wiring convenience, are preferably separated by an air gap 415, 416. The air gaps 415, 416 act to prevent condensed water, which may form during the thawing process, from causing an electrical short circuit.

In addition to the function of heating the current collector, the heater plate 330 can also serve to transfer water injected into the fuel cell stack 110 (for cooling and humidification) from a single water injection inlet 450 to ports 460 corresponding to multiple galleries that run along the length of the fuel cell stack 110, the galleries being configured to deliver water to each individual cell. Water distribution tracks 470 between the inlet 450 and the ports 460 are designed such that they are of substantially equal length, so that the pressure drop and consequent flow rate along each track is equal. The water distribution feature is only required for one of the heater plates 330a, 330b, because water is typically injected at only one end of the fuel cell stack 110. Each heater plate 330 also contains further ports 470 to allow air and hydrogen to pass through to the individual cells.

Figure 4:
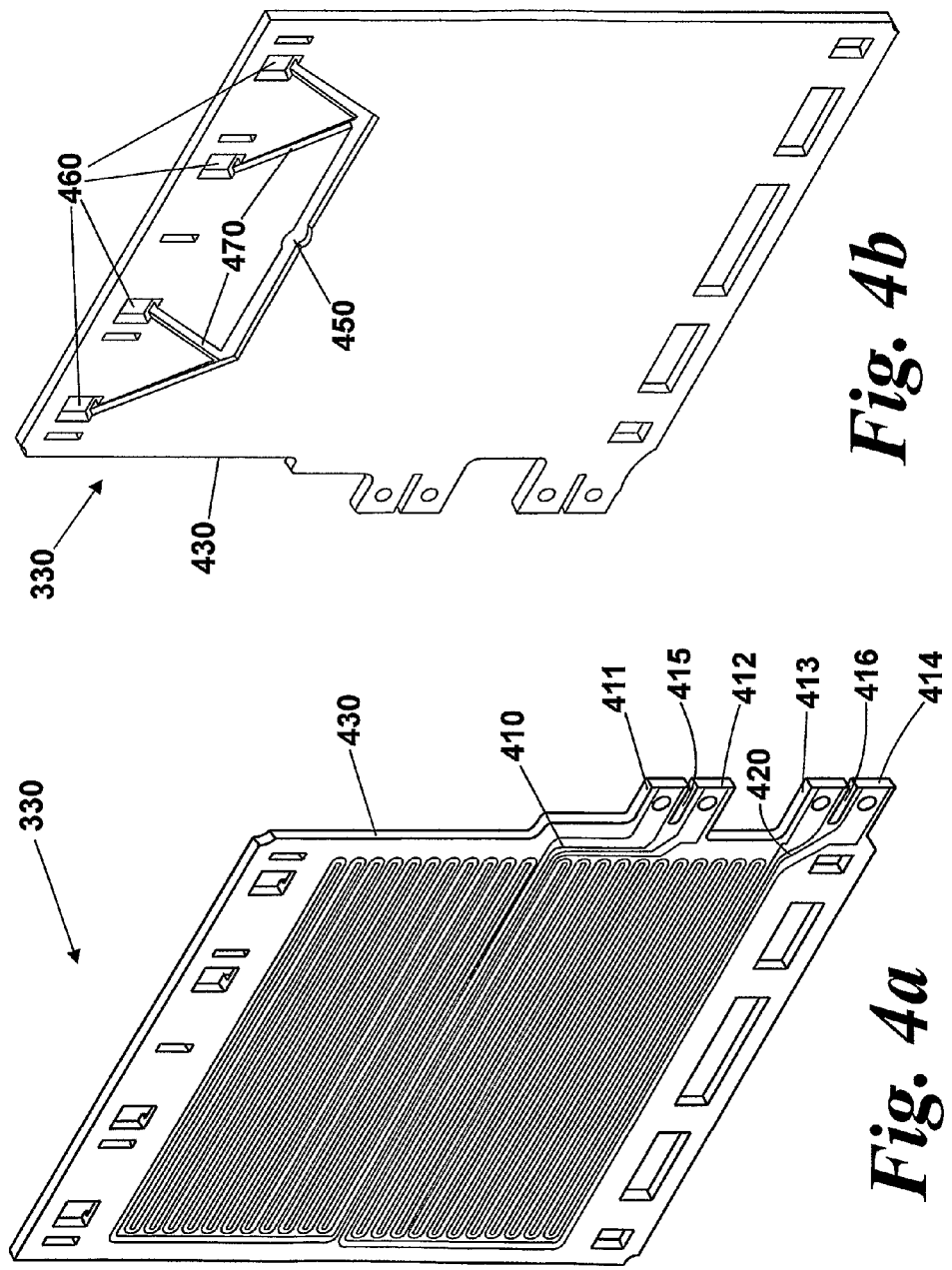
FIGS. 4a and 4b illustrate perspective views of an exemplary heater plate for a fuel cell stack.
Figure 5:
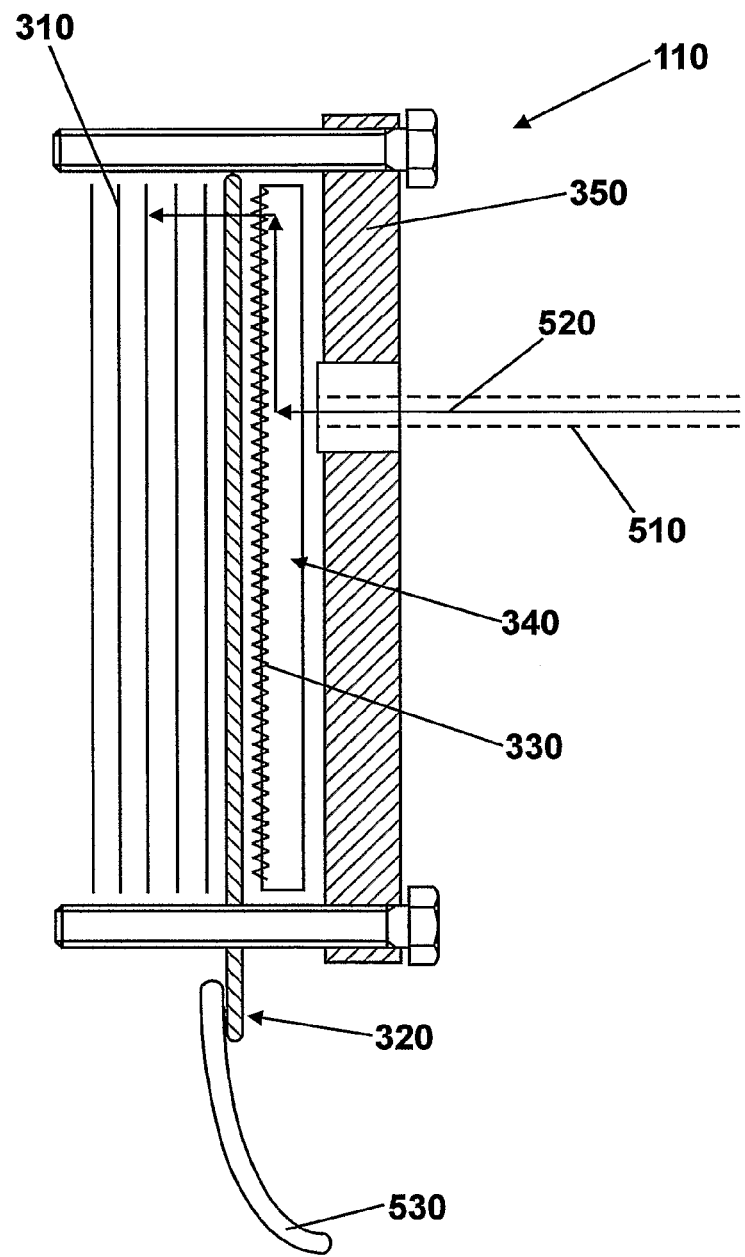
FIG. 5 illustrates a partial schematic cross-sectional view of an exemplary fuel cell stack.

Further illustrated in FIG. 5 is a cross-sectional schematic view of part of the fuel cell stack 110 of FIG. 3. A water feed line 510 allows entry of water through the end plate 350, water being directed along a path indicated by arrow 520. The water feed line 510 preferably comprises a heating element to prevent freezing of water passing through the line 510. Water passes through the end plate, the insulation layer 340, past the water injection inlet in the heater plate 330, along the water distribution tracks 470, through the ports 460 (FIG. 4b) and along the distribution galleries for distribution to the individual cells 310. The current collector plate 320 transmits electric current from the stack 110 through an attached cable 530 to the load 260 (FIG. 2). A benefit of having water distribution tracks 470 in the end plate 35 is that a separate water distribution plate is not required, therefore requiring one fewer component in the fuel cell stack. A further advantage is that the channels are pre-heated, which avoids water freezing on entering the stack.

The construction of fuel cell stack 110 shown in FIG. 5 allows cells 311 at opposing ends of the stack of cells 310 to heat up rapidly, through the heater plates 330 being insulated from the end plates 350. The end plates 350 will generally have a high thermal mass through the need to provide a rigid support structure for even application of compressive pressure across the active area of each of the cells 310. This high thermal mass, if not thermally insulated from the cells 310, will tend to slow the rate of heating at the ends of the stack 110. The individual bipolar plates in the stack 110, however, can be constructed to have a lower thermal mass and can consequently be heated rapidly during the startup procedure. By insulating the end plates, the cells 310 can therefore be heated up more rapidly, allowing for a shorter startup time from cold. Preferably, sufficient heat is applied through the heater plates 330 so that the ends of the fuel cell stack 110 heat up at a similar rate to the middle. Typically, the current collector heaters are sized such that they draw sufficient power when operated to heat the end cells of the stack during startup. If the power drawn is too low the heaters do not heat the cells up sufficiently during startup, and if the power is too high the end cells will tend to overheat and thus limit the performance of the stack.

During a typical start-up from an extended period at sub-zero temperatures, all the components shown in FIGS. 4 and 5 would be below zero Celsius. When the system is started, fuel and oxidant are supplied to the fuel stack cells 310. Electric current then begins to be drawn, and the cells 310 begin to heat up. The heater plate 330 is activated during start-up such that the current pick off plate 320 heats up at a similar rate to the cells 310, which will tend to have a lower thermal inertia as well as being more thermally insulated compared with the cell end plates 350. The cells 319 will eventually reach a temperature where water injection is required to prevent overheating. In a typical fuel cell this will be within a period of around 15 to 60 seconds, when starting from a temperature of −20° C. At this point, water is injected via the heated water feed line pipe 510 (also shown as the cathode water injection line 125 in FIG. 1). It is important that all of the passageways from the pipe 510 through to the individual cells 310 are clear of ice at this point. The water is passed through the end plate 350 and over the heater plate 340 to prevent the water from freezing in the internal transfer ports and water distribution tracks 450, 460, 470 (FIG. 4b).

Advantages of the heater plates 330 as described above include one or more of the following:
i) the plates 330a, 330b allow for rapid electrical heating of the current collectors of the fuel cell stack 110;
ii) connection to an electrical supply is made such that short circuits via condensing water droplets are prevented;
iii) even distribution of cooling water from a single injection point to the appropriate distribution galleries is enabled by the use of distribution tracks 470 of even length;
iv) anode and cathode input and exit fluids can pass through the heater plates 330a, 330b;
v) a reduced thermal lag at the ends of the fuel cell stack results in an improved balancing of the thermal profile of the stack; and
vi) water can be injected earlier, to prevent cells in the center of the stack 110 from overheating, than would otherwise be the case without heater plates 330.

Figure 6:
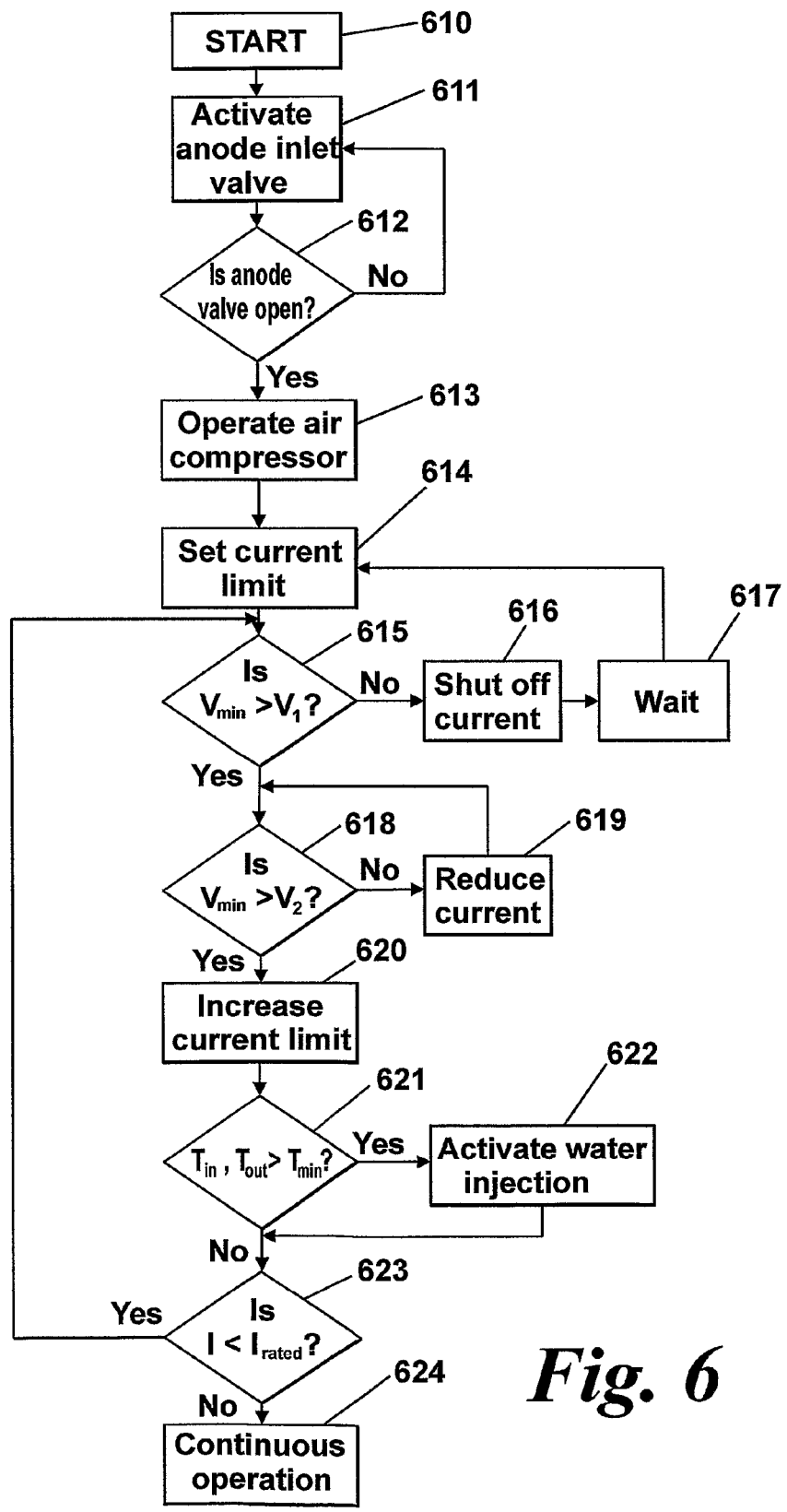
FIG. 6 illustrates a schematic flow diagram of an exemplary start-up procedure.

FIG. 6 illustrates a schematic flow diagram of an exemplary procedure followed during starting operation of a fuel cell system according to the disclosure. The first step 610 is to start operation, for example by applying electrical power (e.g. from a battery storage unit) to the electrical control unit 230 (FIG. 2). The ECU then, at step 611, operates the anode inlet valve 153 (FIG. 1), optionally operating an integrated heater on the valve 153 and/or by activating the solenoid in the valve, as described above. The ECU can determine whether the anode valve is open (step 612) by, for example, monitoring the pressure reading on pressure sensor PX1 (FIG. 1) near or at the anode inlet 156.

Once the anode valve 153 is open, the air compressor 133 is activated (step 613). Alternatively, the air compressor 133 could be activated prior to operating the anode valve 153. An initial current limit is then set for the fuel cell stack 110, at step 614. This initial current limit can be zero or a higher level at which the fuel cell stack 110 can begin safe operation from cold.

During the period when the fuel cell stack 110 is warming up, the ECU proceeds to make decisions based on whether the minimum voltage output from the cells in the stack, $V_{min}$, is higher than the first and second threshold voltage levels $V_1$ and $V_2$, at steps 615 and 618. As described above, these decisions can be made on the basis of the values present on digital lines 211, 212 (FIG. 2). If, at step 615, the minimum cell voltage level is not greater than the first voltage threshold level $V_1$, the current output is shut off (step 616). The process then waits (step 617) for a preset period, typically a few seconds, before reconnecting the current. The current limit may then be set to the level it was before it was shut off, or reset to the initial current limit. If the minimum voltage output is not less than $V_1$, but is not greater than $V_2$, the warning or second voltage threshold level, the current limit is reduced (step 619) until $V_{min}$ is greater than $V_2$.

The current limit is then increased (step 620) by a preset amount. The rate at which the current limit is increased may be a set amount, such as 0.5 Amps per second, or some other rate dependent on the presently set level.

At step 621, an assessment of whether the temperature readings in the inlet 123 and outlet 121 lines of the cathode flow path, $T_{in}$, $T_{out}$ respectively, are greater than a minimum required temperature, $T_{min}$. These temperature readings can be obtained, for example, from temperature sensors TX2, TX3 (FIG. 1). If both temperature readings are greater than $T_{min}$, the water injection system is activated, at step 622. Alternatively, the decision at step 621 may depend solely on the temperature $T_{out}$ of the cathode outlet line. The water injection system then continues in operation, varied according to the temperature of the cathode air stream, until or unless the temperature of the air stream falls below the minimum level $T_{min}$ or if the fuel cell system is to be shut down.

During start-up, an assessment is made, at step 623, of whether the current limit I has reached the rated current of the fuel cell stack 110. If the current limit is less than the rated current, $I_{rated}$, the start-up process continues, proceeding to the previous step 615. Once the current limit is reached, the fuel cell system proceeds to a continuous mode of operation, at step 624.

During continuous operation, the fuel cell system 100 preferably continues monitoring the voltage level $V_{min}$ and temperature of various parts of the system 100. The ECU also continues to monitor the operation and adapt the operating parameters of the system 100 to optimize operation, as described above.

Figure 7:
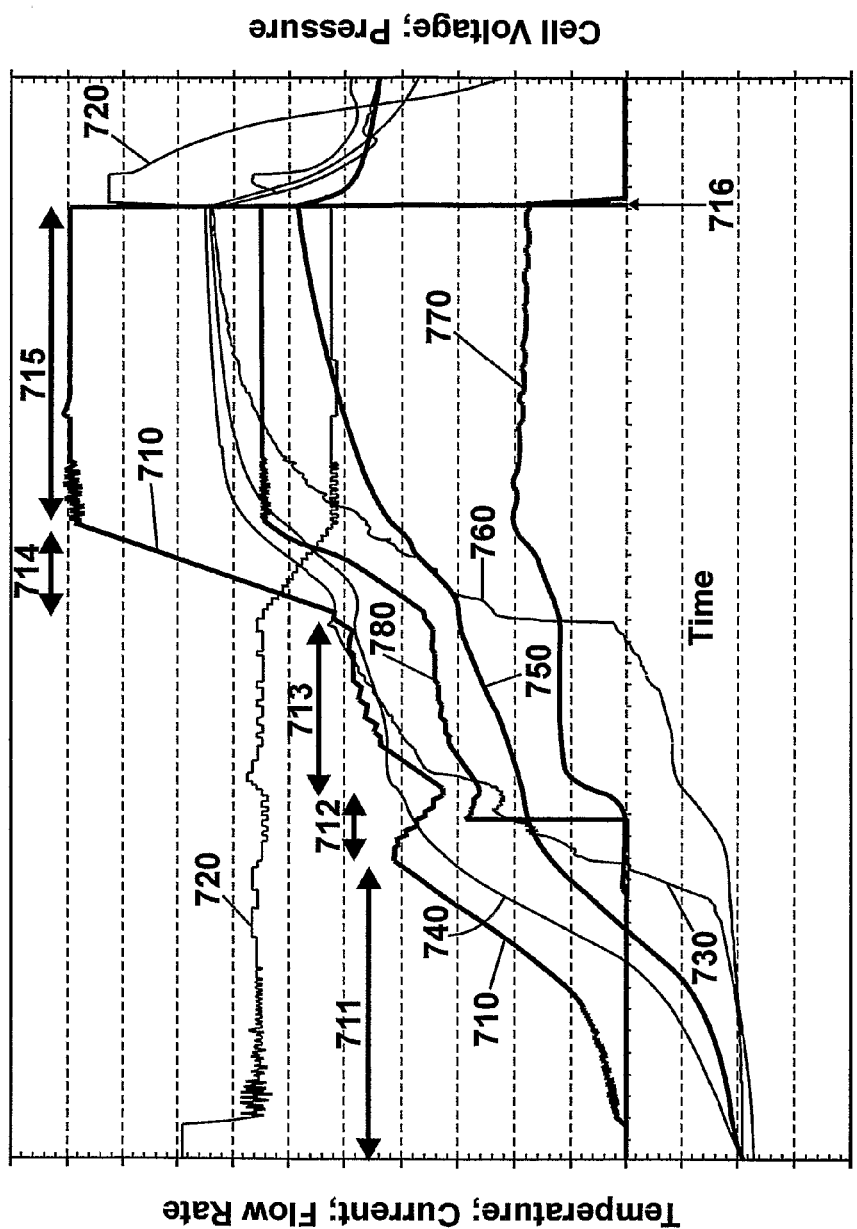
FIG. 7 illustrates a series of curves showing various measured parameters from a fuel cell system.

FIG. 7 illustrates exemplary data from a fuel cell system during start-up, in which the load current 710 rises from zero up towards the rated current, in this case 100 A. The stack voltage 720 varies as a result during this rise in current. Also shown in FIG. 7 are curves corresponding to variation in the cathode exhaust temperature 730, the end plate water control temperature 740, the end plate air temperature 750, the anode exhaust temperature 760, the water pump back pressure 770 and the cathode water flow rate 780 during start-up.

The test illustrated in FIG. 7 was carried out on a 20 cell stack. A set point of 13 volts was used for the ECU 230, operating in a closed loop control mode. Initially, with the stack starting from cold (i.e. at −20° C.), a set point of 13V was achieved with a current load of a few amps. As the stack warms up, the ECU tries to regulate the stack voltage to 13V and ramps up the current 710. At the end of a first time period 711, the stack voltage 720 falls due to one or more of the cells performing less well, in this case due to overheating. The ECU then reduces the current as a result. At the end of a second time period 712, the water injection system is turned on. Once water is injected into the stack, the voltage rises. The ECU then ramps up the current 710 until the anode exhaust temperature passes 0° C. At this point the stack is considered to be thawed out, so the current 710 is ramped more rapidly to the full load point of 100 A.

In the strategy described above, the ramp rates for increasing the current load are limited to predetermined maximum levels. In the particular test illustrated by FIG. 7, the water injection system was activated only when the cathode exhaust reached 20° C., in order to ensure that water did not freeze in the stack on being injected.

In the test illustrated by FIG. 7, during the initial first time period 711 the current load 710 gradually increases from zero to around 40 A, while the measured stack voltage 720 remains roughly constant (after an initial fall on application of the load). After the ECU detects that the voltage of one or more of the cells in the stack has fallen below a warning threshold level, the current load 710 is gradually reduced over the second time period 712 until the warning voltage threshold is exceeded. Over the first and second time periods 711, 712, the temperature of the cathode exhaust temperature 730 rises and, during the second time period 712, exceeds 20° C., at which point the water injection system is activated. The start of water injection is indicated by a sudden increase in the cooling water flow rate 780, followed by a small fall in the cathode exhaust temperature 730. The end plate water and air temperature 740, 750 continue to gradually rise throughout the start-up period, as the end plate heaters 330 are activated and the stack continues to warm.

During a third time period 713, the current load 710 continues to rise, though at a reduced rate limited by the voltage output of the cells of the stack. A sharp rise in the anode exhaust temperature 760 towards the end of this period 713 indicates that the cells in the stack are optimally heated and humidified. This is followed by a faster rise in current load during a fourth time period 714, during which the current load does not need to be backed off due to low cell voltage. The rated current of 100 A is then reached and the fuel cell system begins continuous operation over a fifth time period 715. At shutdown 716 of the fuel cell system, between 17 and 18 minutes after initial start-up, the current load 710 is cut and the water injection system disabled, the latter indicated by a sharp drop in the water pump back pressure 770. The stack voltage 720 rapidly rises in the absence of the current load 710, and then gradually falls off as the remaining fuel in the fuel cell 110 dissipates.

While the method and agent have been described in terms of what are presently considered to be the most practical and preferred implementations, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the implementation, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting, such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternatives.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

All callouts associated with figures are hereby incorporated by this reference.

Since certain changes may be made in the above apparatus without departing from the scope of the invention herein involved, it is intended that all matter contained in the above description, as shown in the accompanying drawing, shall be interpreted in an illustrative, and not a limiting sense.

The invention claimed is:

1. A fuel cell system comprising a fuel cell stack, heater plates provided at opposing ends of the fuel cell stack, and an electrical control unit configured to adjust operating parameters of the fuel cell stack including a level of heat applied to the fuel cell stack by means of the heater plates to optimize operation of the fuel cell system based on a standard deviation of voltage outputs from a plurality of cells in the fuel cell stack, wherein the electrical control unit is configured to optimize operation of the fuel cell system by adjusting the operating parameters of the fuel cell stack to reduce the function $$f(\sigma_v, P_p) = \alpha(\sigma_v)^2 + \beta(P_p)^2$$

where $\sigma_v$ is a standard deviation of the voltage outputs of the plurality of cells, $P_p$ is a parasitic load consumed by the heater plates and $\alpha$, $\beta$ are constants.

* * * * *